US012812259B2

(12) United States Patent
Alliot et al.

(10) Patent No.: US 12,812,259 B2
(45) Date of Patent: Nov. 24, 2026

(54) ROAD TRAFFIC MONITORING ROBOT IMAGE ACQUISITION DEVICE INSTALLATION KIT

(71) Applicant: IDEMIA IDENTITY & SECURITY FRANCE, Courbevoie (FR)

(72) Inventors: Samuel Alliot, Courbevoie (FR); Grégoire Carrion, Courbevoie (FR); Eric Guidon, Courbevoie (FR); Jean-Jacques Arroyo, Courbevoie (FR)

(73) Assignee: IDEMIA ROAD SAFETY FRANCE, Courbevoie (FR)

( * ) Notice: Subject to any disclaimer, the term of this patent is extended or adjusted under 35 U.S.C. 154(b) by 0 days.

(21) Appl. No.: 18/953,848

(22) Filed: Nov. 20, 2024

(65) Prior Publication Data

US 2025/0175714 A1 May 29, 2025

(30) Foreign Application Priority Data

Nov. 24, 2023 (FR) .................................. FR2313002

(51) Int. Cl.
*H04N 23/90* (2023.01)
*H04N 23/55* (2023.01)

(52) U.S. Cl.
CPC ............. *H04N 23/90* (2023.01); *H04N 23/55* (2023.01)

(58) Field of Classification Search
CPC .... G08G 1/0175; G03B 17/561; H04N 23/90; G06T 2207/30236; G06T 7/20
See application file for complete search history.

(56) References Cited

U.S. PATENT DOCUMENTS 7,997,546 B1 * 8/2011 Andersen .................. F16B 2/06 248/230.8
9,075,290 B1 7/2015 Thieman
(Continued)

FOREIGN PATENT DOCUMENTS

CN 208154015 U 11/2018
CN 215954497 U * 3/2022
(Continued)

OTHER PUBLICATIONS

French Preliminary Search Report mailed Sep. 19, 2024 in FR 2313002 filed on Nov. 24, 2023, 10 pages (with Written Opinion).

*Primary Examiner* — Fabio S Lima
(74) *Attorney, Agent, or Firm* — Oblon, McClelland, Maier & Neustadt, L.L.P.

(57) ABSTRACT

A road traffic monitoring robot image acquisition system installation kit including:

a plurality of optical device with different focal lengths, each optical device including an optical lens and a photosensitive sensor, a fixing plate adapted to form a mechanical connection between a plurality of optical devices of said plurality of optical devices, in which the fixing plate includes a fixed context video camera and a plurality of selectable fixing positions for each optical device of the plurality of optical devices, said selectable fixing positions are arranged in such a manner as to form a plurality of pre-established alignments between the fixed context video camera and one or more optical devices selected from the plurality of optical devices, said pre-established alignments and said selectable positions are configured according to a correspondence chart, (Continued)

said correspondence chart supplies a plurality of pre-established alignments depending on the number of and the width of the traffic lanes to be monitored by the robot, the position of and the distance from the infraction line of said acquisition system, and the number of and the focal lengths of the optical lenses necessary for coverage of said traffic lanes.

17 Claims, 3 Drawing Sheets

(56) References Cited

U.S. PATENT DOCUMENTS

| | | | | |
|---|---|---|---|---|
| 9,578,309 | B2 * | 2/2017 | Prechtl | H04N 13/194 |
| 2002/0145042 | A1 * | 10/2002 | Knowles | G02B 26/10<br>235/462.01 |
| 2003/0052169 | A1 * | 3/2003 | Tsikos | G06V 20/62<br>235/454 |
| 2011/0174086 | A1 * | 7/2011 | Harish | G01L 1/26<br>73/862.626 |
| 2014/0007909 | A1 * | 1/2014 | Manaois | G02B 27/0006<br>134/18 |
| 2015/0373267 | A1 * | 12/2015 | Lapstun | G01C 11/02<br>348/144 |
| 2022/0284812 | A1 * | 9/2022 | Yamoto | G06V 20/584 |
| 2022/0303445 | A1 * | 9/2022 | Skaff | G03B 30/00 |
| 2022/0365406 | A1 * | 11/2022 | Ye | F16M 11/04 |
| 2023/0073710 | A1 * | 3/2023 | Wang | G01N 3/24 |

FOREIGN PATENT DOCUMENTS

| | | | | | |
|---|---|---|---|---|---|
| CN | 221858012 | U | * | 10/2024 | |
| EP | 3 012 652 | A1 | | 4/2016 | |
| EP | 3012652 | B1 | * | 11/2020 | G01S 7/027 |
| KR | 10-1748552 | B1 | | 6/2017 | |

* cited by examiner

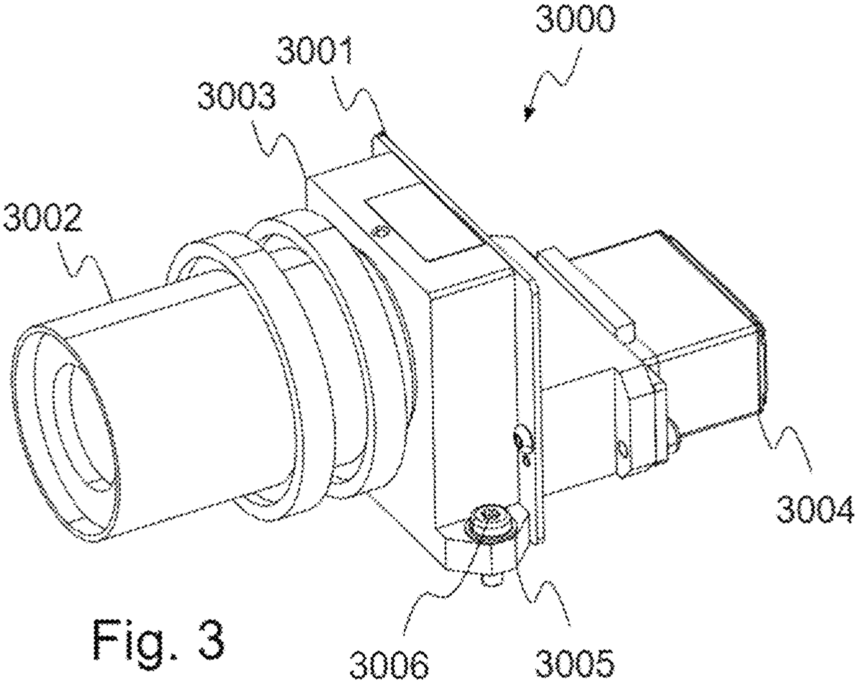
Fig. 3
Fig. 4
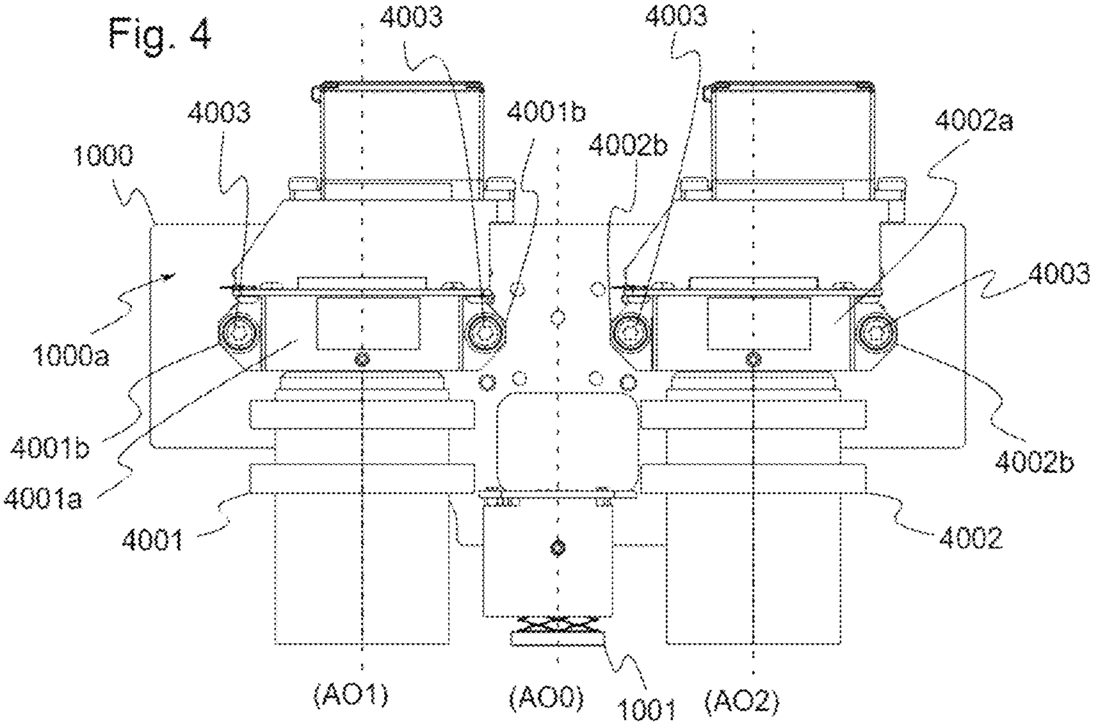

ROAD TRAFFIC MONITORING ROBOT IMAGE ACQUISITION DEVICE INSTALLATION KIT

TECHNICAL FIELD

The present invention concerns a road traffic monitoring robot image acquisition device installation kit. It also has for object a method of installing a road traffic monitoring robot image acquisition device using such a kit.

TECHNICAL BACKGROUND

It is standard practice to control or to monitor road traffic using robots including speed and distance sensors—radar or laser devices for measuring vehicle speed and position—and optical systems configured for the acquisition of images of the interior and/or of the exterior of the vehicles. These robots are programmed to detect and to characterise some infractions of road traffic laws committed by the drivers of the vehicles thanks to the combined analysis of the speed and distance sensor signals and the images acquired. They enable in particular production of elements typing and proving the infractions and extraction from the images identification information such as the registration numbers of the vehicles for drawing up a report.

The reliability of these robots relies in part on the exactness and the robustness of the arrangements and the alignments of the speed and distance sensors and the optical systems with one another in order to ensure, for each monitored vehicle, a perfect agreement between the speed and distance sensor and the images acquired by these systems. This agreement is essential for eliminating any ambiguity as to whether a vehicle identified as in infraction by the speed and distance sensors corresponds exactly to the vehicle an image of which is acquired by the optical devices for its identification.

Apart from this optical coupling between speed and distance sensors and optical devices, the optical systems must also be oriented in specific directions depending on the topographical constraints of the road environment in which the control robot is installed and the number and the width of the lanes to be monitored. It is standard practice to carry out manually, in the factory, adjustments of the positions and orientations of the optical devices. These adjustments, which may in some cases be completed by adjustments on the installation site, are based on the ability of a human operator to analyse a number of images acquired by the optical systems when vehicles are passing and to establish an optimum configuration for all of the optical elements in order to ensure both maximum coverage of the lanes and the best agreement between the speed and distance sensor data and the acquired images. There are also robots enabling installation to be facilitated and human errors to be reduced.

EP 2 690 459 A2, JENOPTIK ROBOT GMBH [DE], 29 Jan. 2014 describes a road traffic monitoring robot including a radar or laser speed and distance sensor and two video cameras, one of which is a high-resolution camera. The speed and distance sensor and the two video cameras are arranged in such a manner that their respective optical fields overlap. The robot includes a data processing unit configured to identify objects in the images acquired by the two video cameras and to compare their positions with those measured by the speed and distance sensor.

EP 3 012 652 A1, MORPHO [FR], 27 Apr. 2016 describes a road traffic monitoring unit including a speed and distance sensor and optical devices mechanically assembled with the aid of a plate. The plate includes an assembly of a main part and two secondary parts, and the two secondary parts are each adapted to support an optical device. The three parts comprise removable fixings configured to orient the optical devices in a predetermined constant angular orientation relative to a radioelectric axis of the speed and distance sensor. Margins for adjustment of the orientation are provided to take into account possible variations in the width of the traffic lanes of the road, the average speed of the vehicles on the road, or the topography of the plate where the road traffic monitoring unit is installed. The orientation and its adjustment margins for each of the optical devices are defined by the plate itself. This unit simplifies installation and improves the correctness of its adjustment to ensure a match between the vehicle checked by the speed and distance sensor and that appearing in the images acquired by the optical devices.

WO 2022/223921 A1, IDEMIA IDENTITY & SECURITY FRANCE [FR], 27.10.2022 describes an image acquisition device including a one-piece plate and three optical devices the optical axes of which are coplanar. The optical axes of the three optical devices are oriented in such a manner that their field angles overlap partially and the support optical vectors of the optical axes satisfy particular vectorial relationships. The plate may further include a fourth optical device the optical axis of which intersects the optical axes of two other optical devices at a given point in space. This device enables the acquisition of a low-resolution wide-angle image to which is transferred a high-resolution narrow-field image. The device is more economical in that it dispenses with the use of a high-resolution wide-angle optical device.

SUMMARY OF THE INVENTION

Technical Problem

A drawback of the control unit described in EP 3 012 652 A1, MORPHO [FR], 27 Apr. 2016 is the lack of modularity, of customisation and of adaptability. The fixing plate of the control unit is dedicated to a given range of installation distance values and, in that range, to optical devices with given focal lengths. It is therefore necessary for an operator to have available a set of interchangeable plates on each of which is recorded the installation distance value range and the dedicated focal length. In the event of modification of the topography of the control zone and/or of the characteristics of the road alongside which the unit is installed, such as the number and/or the width of the lanes, a change of orientation, or the construction of peripheral sloping noise barriers, the operator may be obliged to substitute completely for the existing plate a new one with all of its lenses and to proceed to new adjustments. Not only does such substitution constitute a loss of time but also a loss of hardware if the old plate cannot be reused.

Another drawback of the control unit is that it is necessary to manufacture a plurality of different fixing plates for each installation distance value range and each dedicated set of optical lenses. Such multiplication of the distinctive features between the plates involves recourse to production lines specific to each plate and therefore an additional production cost. Furthermore, there is a risk that a certain number of plates dedicated to certain installation distance value ranges and to certain optical lenses are produced uselessly if they are not used for lack of opportunities. This results in financial loss and loss of hardware.

Technical Solution

A first aspect of the invention provides a road traffic monitoring robot image acquisition system installation kit as described in claim 1, the dependent claims being advantageous embodiments.

A second aspect of the invention provides a method of installing a road traffic monitoring robot image acquisition system with the aid of a kit according to the first aspect of the invention.

BRIEF DESCRIPTION OF THE DRAWINGS

FIG. 3 is a schematic perspective view of an optical device.

FIG. 4 is a schematic representation of a fixing plate to which are fixed two devices in a pre-established first alignment.

DETAILED DESCRIPTION OF EMBODIMENTS

Figure 1:
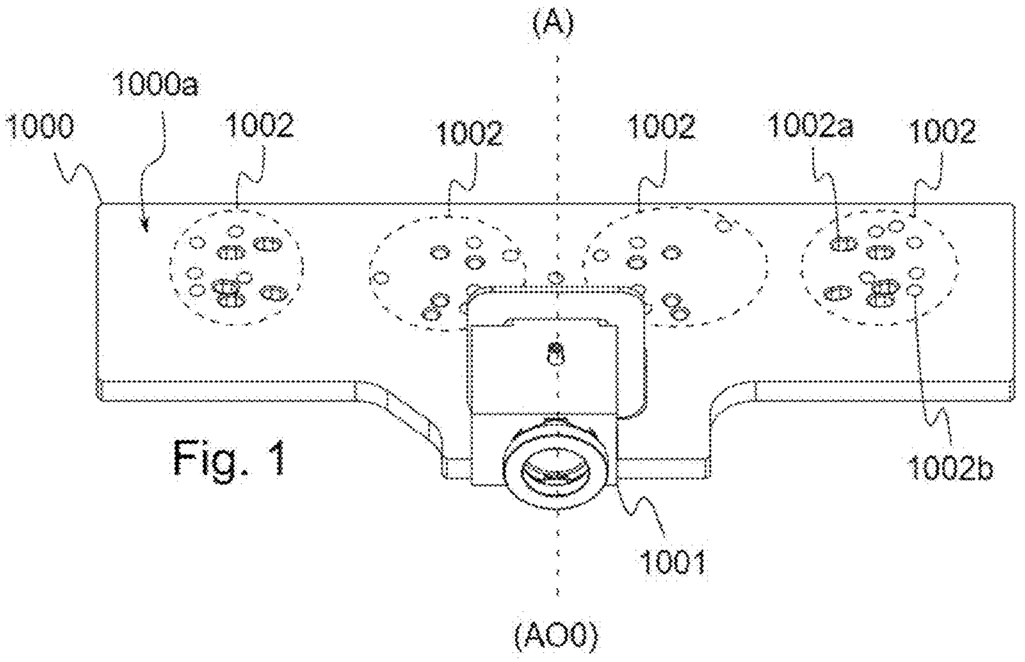
FIG. 1 is a schematic perspective view of a plate for an installation kit according to the first aspect of the invention.
Figure 2:
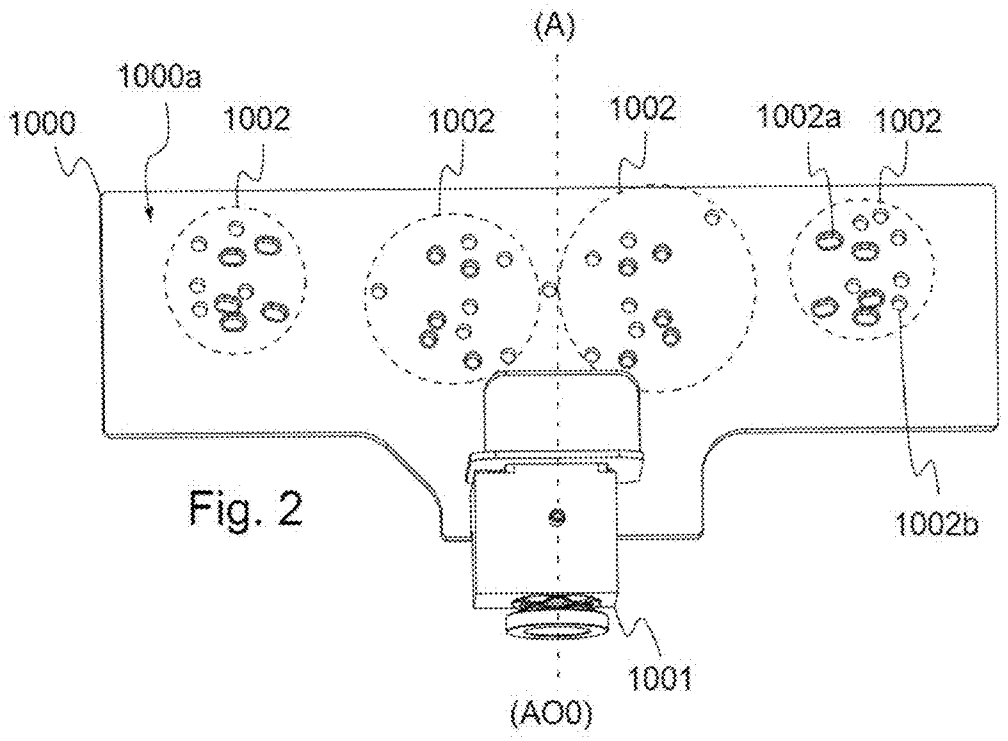
FIG. 2 is a schematic front view of the plate from FIG. 1.

A first aspect of the invention provides a road traffic monitoring robot image acquisition system installation kit shown in FIGS. 1 to 3 and including:

- a plurality of optical device 3000 with different focal lengths, each optical device including an optical lens 3002 and a photosensitive sensor 3001,
- a fixing plate 1000 adapted to form a mechanical connection between a plurality of optical devices of said plurality of optical devices 3000, in which
- the fixing plate 1000 includes a fixed context video camera 1001 and a plurality of selectable fixing positions 1002 for each optical device of the plurality of optical devices 3000,
- said selectable fixing positions 1002 are arranged in such a manner as to form a plurality of pre-established alignments between the fixed context video camera 1001 and one or more optical devices selected from the plurality of optical devices 3000,
- said pre-established alignments and said selectable positions 1002 are configured according to a correspondence chart,
- said correspondence chart supplies a plurality of pre-established alignments depending on the number of and the width of the traffic lanes to be monitored by the robot, the position of and the distance from the infraction line of said acquisition system, and the number of and the focal lengths of the optical lenses necessary for coverage of said traffic lanes.

Referring to FIG. 3, in the context of the present invention by "optical device" is meant a device 3000 adapted to acquire photographic or video images of traffic lanes with given focal lengths and magnifications. Such a device generally includes an optical lens 3002 and a photosensitive sensor 3001. In FIG. 3 the photosensitive sensor 3001 is supported by an electronic circuit card disposed inside a chassis 3003. The optical device 3000 may further include an electronic connector 3004 such as a multipin connector for its electrical power supply and for the transmission of the images acquired to a data processing device such as a computer.

By "photosensitive sensor" 3001 is meant a photosensitive electronic component capable of converting electromagnetic radiation, in particular ultraviolet, visible or infrared electromagnetic radiation, into an electrical signal and then to process it to form an image from it. Such an electronic component is generally free of any optical elements, such as a lens, able to form an optical system the principal function of which is to modify the trajectory of the electromagnetic radiation before its capture by the active surface of said component. In the case of a digital photosensitive sensor, the active surface of the photosensitive sensor may be provided with microlenses having the function of concentrating the electromagnetic radiation onto each pixel of the active surface. These microlenses form part of the active surface of the sensor and are not components mounted thereon.

By "optical lens" 3002 is meant an optical system the principal function of which is to modify the trajectory of the electromagnetic radiation. There is meant in particular by optical lens an optical device formed by a succession of spherical, aspherical or plane diopters such as optical lenses capable of forming an image of an object situated at certain depths of field. A photographic lens is an example of an optical lens that can be used in the context of the invention.

By "fixing plate" 1000 is meant any support able to support optical devices 3000 and to provide a rigid mechanical connection between them. This support is generally a support having at least one main part on which the context video camera and the optical device or devices can be fixed. The support is preferably made of metal or metal alloy. It may be made of steel or of aluminium alloy.

In accordance with the invention, the selectable fixing positions are arranged in such a manner as to form a plurality of pre-established alignments between the fixed context video camera 1001 and one or more optical devices selected from the plurality of optical devices 3000. In other words, referring to FIGS. 4 and 5, each of the selectable fixing positions 1002, when one or more optical devices 4001, 4002, 5001, 5002 are mounted thereon, orients the optical axis (AO1), (AO2) of said optical devices 4001, 4002, 5001, 5002 in a pre-established given direction relative to the optical axis (AO0) of the context video camera 1001. The context video camera 1001, to be more precise its optical axis (AO0), thus serves as a reference axis for each alignment of the plurality of alignments.

Figure 5:
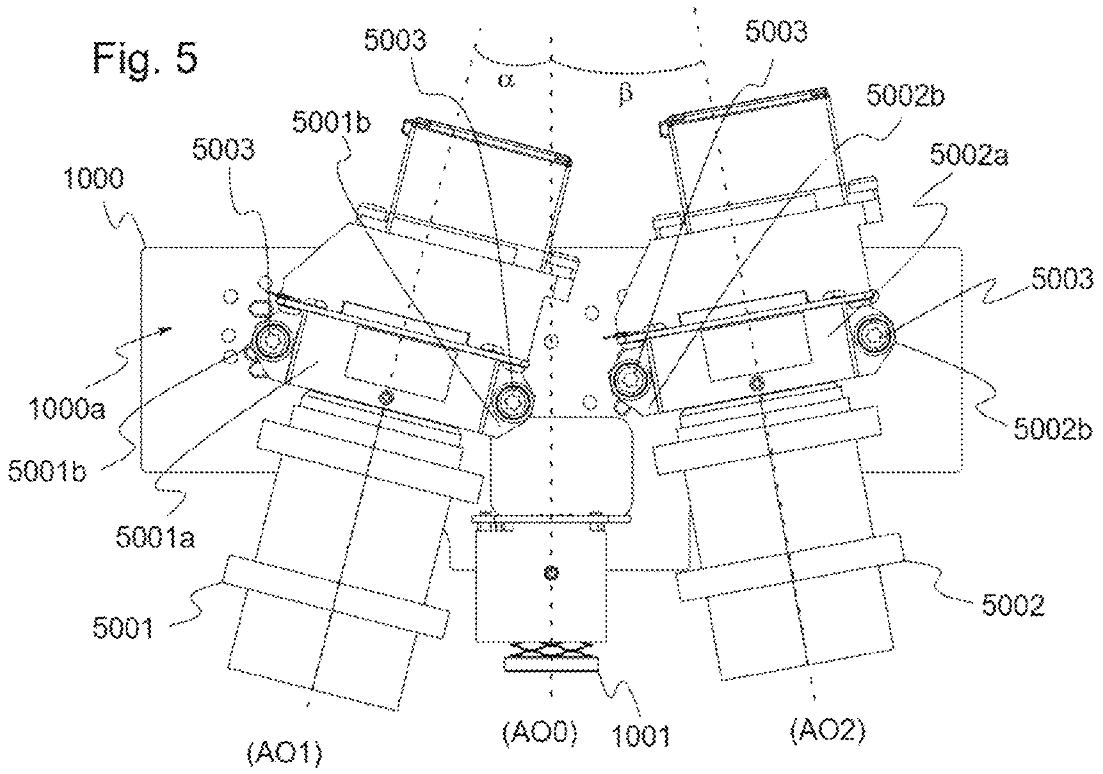
FIG. 5 is a schematic representation of a fixing plate to which are fixed two devices in a pre-established second alignment.

Referring to FIG. 4, in a first alignment example the two optical devices 4001, 4002 are fixed at selectable fixing positions 1002 the pre-established alignments whereof orient their optical axes (AO1), (AO2) in a direction parallel to the optical axis (AO0) of the context video camera 1001. Referring to FIG. 5, in a second alignment example the two optical devices 5001, 5002 are fixed at selectable fixing positions 1002 the pre-established alignments of which orient their optical axes (AO1), (AO2) in respective different angle directions a, B relative to the optical axis (AO0) of the context video camera 1001.

The alignments are generally pre-established at the stage of design and manufacture of the plate and the optical devices. Thus the alignments can be adapted to suit current topographies of the control zones likely to be monitored by the road traffic monitoring robot in which the kit according to the first aspect of the invention is implemented. The alignments are pre-established so as to be able to cover any type of control zone in curved, straight and/or inclined road sections, such as turns, straights, upgrades and downgrades. The alignments can also be adapted to suit topographies of particular control zones, in particular according to particular geographical features of the places where the zones are situated.

The selectable fixing positions 1002 and the pre-established alignments that they establish are configured according to a correspondence chart that provides a plurality of alignments depending on the width of the traffic lanes to be monitored by the robot, the position of and the distance from the infraction line of said acquisition device, and the number of and the focal lengths of the optical lenses necessary for coverage of said traffic lanes. The corresponding chart preferably covers 2 to 8 traffic lanes. One example of a chart is provided in table 1.

TABLE 1

| | Number of optical devices | 1 | 1 | 1 | 1 | 2 | 2 | 2 |
|---|---|---|---|---|---|---|---|---|
| | Focal length (mm) | 16 | 25 | 35 | 50 | 25 | 35 | 50 |
| 2 lanes | Min distance(m) | 10 | 14 | 20 | 28 | 10 | 12 | 16 |
| | Max distance (m) | 20 | 30 | 44 | 60 | 28 | 40 | 56 |
| 3 lanes | Min distance(m) | 14 | 20 | 28 | 40 | 12 | 16 | 24 |
| | Max distance (m) | 20 | 30 | 42 | 60 | 26 | 36 | 46 |
| 4 lanes | Min distance(m) | 18 | 26 | 30 | 52 | 15 | 19 | 27 |
| | Max distance (m) | 20 | 30 | 44 | 60 | 26 | 39 | 56 |
| 5 lanes | Min distance(m) | NO | NO | NO | NO | 18 | 24 | 32 |
| | Max distance (m) | | | | | 26 | 38 | 52 |
| 6 lanes | Min distance(m) | NO | NO | NO | NO | 20 | 28 | 40 |
| | Max distance (m) | | | | | 26 | 38 | 52 |
| 7 lanes | Min distance(m) | NO | NO | NO | NO | 22 | 32 | 44 |
| | Max distance (m) | | | | | 26 | 38 | 52 |
| 8 lanes | Min distance(m) | NO | NO | NO | NO | 26 | 36 | 50 |
| | Max distance (m) | | | | | 26 | 38 | 56 |

In a first example based on the table 1 chart, for a control robot situated between 10 and 20 metres from a control zone including two lanes, a single optical device with a focal length of 16 mm may be selected from the plurality of devices of the kit according to the first aspect of the invention. The optical device can then be fixed to the fixing plate at the selectable fixing positions provided for said optical device.

In a second example based on the table 1 chart, for a control robot situated 40 to 52 metres from a control zone including six lanes, two optical devices with a focal length of 50 mm may be selected from the plurality of devices of the kit according to the first aspect of the invention. The two optical devices may then be fixed to the fixing plate in the selectable fixing positions provided for said optical devices.

The chart is of any appropriate form. It may be implemented on a physical support such as a manual or paper diagram that accompanies the kit according to the first aspect of the invention. It may also be implemented on a non-material support such as a tablet into which it has been loaded beforehand or can be downloaded by reading a code symbol, such as a 2D bar code (data matrix), on the plate. The correspondence chart may advantageously be part of an augmented reality software suite having the function of virtually superimposing an image from the optical devices in the appropriate selectable positions on the plate depending on the number of and the width of the traffic lanes to be monitored by the robot, the position of and the distance from the infraction line of said acquisition device, and the number of and the focal lengths of the optical lenses necessary for the coverage of said traffic lanes. Such a function may advantageously assist an operator in use of a kit according to the first aspect of the invention.

The function of the context video camera 1001 is to provide a wide-angle view or a panorama of a zone likely to be monitored by a control robot in which a kit according to the first aspect of the invention is used. Also, in a preferred embodiment the context video camera 1001 is a wide-angle video camera, preferably of high resolution. It may include a lens with a short focal length and with a field angle of at least 50°, preferably at least 70°, even at least 90°. The context video camera is preferably a high-resolution video camera in particular enabling acquisition of images with a definition of at least 720p, even 1080p.

The context video camera 1001 is mechanically rigidly attached to the fixing plate 1001. It may be fixed thereto with the aid of any appropriate fixing means, preferably removable fixing means, such as nuts and bolts. Referring to FIGS. 1 to 5, it may be disposed on any appropriate part of the fixing plate 1001, in particular on a part in which the optical devices 4001, 4002, 5001, 5002 likely to be fixed to said plate do not obstruct its field of view. It may be fixed to the same face 1000*a* to which one or more optical devices 4001, 4002, 5001, 5002 is or are likely to be fixed or to an opposite face.

Referring to FIG. 1, in a preferred embodiment the optical axis (AO0) of the context video camera 1001 coincides with an axis of symmetry (A) of the fixing plate 1001. For example the optical axis (AO0) of the video camera 1001 may coincide with the axis of symmetry (A) of the face 1000*a* of the plate serving to support the context video camera 1001 and the optical devices. This is advantageous in that it facilitates the definition of the selectable positions forming pre-established alignments at the time of design and manufacture of the fixing plate and enables the use of the kit on either side of a traffic lane.

The kit according to the first aspect of the invention may include any type of optical device 3000 adapted to monitor traffic lanes, in particular for producing traffic law infraction typing and proof elements and extraction from acquired images of identification information such as the registration numbers of vehicles. In some embodiments the plurality of optical devices 3000 comprises short focal length optical lenses 3002 the focal length of which varies between 10 mm and 100 mm, preferably between 15 mm and 50 mm.

The size of the fixing plate 1000 and the number of its selectable positions depend on the number of optical devices 3000 that it is likely to support, on which there is no limit. Nevertheless, in preferred embodiments the fixing plate is adapted to receive at least one optical device, preferably at least two optical devices, even at least three optical devices.

The number of optical devices that the kit according to the first aspect of the invention may include depends on the number of different configurations that the correspondence chart is able to cover as to the features of the zones likely to be monitored. The kit may include four pairs of optical devices, each pair corresponding to a different focal length.

The selectable fixing positions 1002 are of any type suitable for fixing optical devices. Referring to FIGS. 1 and 2, they may for example take the form of orifices into which the optical devices can be fixed, for example clipped or fixed by means of nuts and bolts. Referring to FIGS. 4 and 5, in a preferred embodiment the fixing plate 1000 is provided with removable fixings 4003, 5003 suitable for fixing devices of the plurality of optical devices 4001, 4002, 5001, 5002. Removable fixings may for example be nuts and bolts intended to be introduced into the orifices 1002*a*, 1002*b* corresponding to the selectable positions 1002.

Referring to FIGS. 3, 4 and 5, the optical devices 3000 may advantageously comprise a fixing chassis 3003, 4001*a*,

5001*a* adapted to facilitate fixing it to the fixing plate 1000. For example, the chassis 3003, 4001*a*, 4002*a*, 5001*a*, 5002*a* may be provided with two fixing lugs 3005, 4001*b*, 4002*b*, 5001*b*, 5002*b* situated on respective opposite sides of the devices 3000, 4001, 4002, 5001, 5003. When the selectable fixing positions 1002 take the form of orifices 1002*a*, 1002*b* each fixing lug 3005, 4001*b*, 4002*b*, 5001*b*, 5002*b* may include an orifice arranged in such a manner that it corresponds to a corresponding orifice at a selectable fixing position. Each fixing lug 3005, 4001*b*, 4002*b*, 5001*b*, 5002*b* may then be fixed to the fixing plate 1000 using removable fixing means such as nuts and bolts 3006, 4003, 5003.

In advantageous embodiments the fixing chassis 3003, 4001*a*, 4002*a*, 5001*a*, 5002*a* of each optical device 3000, 4001, 4002, 5001, 5002 is arranged in such a manner that it can be fixed only at a limited number of selectable fixing positions, for example one, two or three positions. Such an arrangement introduces a polariser function. The risk of errors likely to be committed by an operative when they proceed to place optical devices on the plate according to the invention can therefore be significantly reduced. For example, after selecting one or two devices with the aid of the chart the operator cannot inadvertently commit the error of installing the optical devices at the wrong fixing positions.

In one embodiment the selectable fixing positions 1002 are arranged in such a manner that the pre-established alignments have a margin for adjustment, preferably a margin for adjustment less than 5°, even 2°, even 1° on either side of a nominal orientation of said pre-established alignments. Referring to FIGS. 1 and 2, in one embodiment certain orifices 1002*a* corresponding to each selectable fixing position 1002 may be of oblong shape and provide a margin for adjustment through cooperation with a circular orifices 1002*b* having a pivot function. When an optical device 3000 is fixed to the fixing plate with the aid for example of two nuts and bolts corresponding to two orifices of a selectable fixing position the nuts and bolts mounted in the circular orifice 1002*b* remain fixed to form a pivot while the nuts and bolts mounted in the oblong orifices 1002*a* are able to move along said orifice to enable movement of the optical device in a plane substantially parallel to the plate. The centre of the orifice corresponds to the nominal orientation of the pre-established alignment and its length constitutes a margin for adjustment less than 5°, even 2°, even 1° on either side of this nominal orientation. Once the orientation has been chosen the nuts and bolts mounted in the oblong orifice 1002*a* are tightened to immobilise the optical device 3000 in that orientation.

A second aspect of the invention provides a method of installing a road traffic monitoring robot image acquisition device. The method enables use of an installation kit according to the first aspect of the invention. The method comprises the following steps:

providing an installation kit for an image acquisition device according to any of the embodiments of the first aspect of the invention, assembling the fixing plate 1000 in the space of the robot provided for this purpose, measuring the position of and the distance of the fixing plate 1000 from an infraction line with the aid of a context video camera 1001, selecting one or more optical devices with the same or different focal lengths from the plurality of devices 3000 of the kit according to the correspondence chart of the kit depending on the number of and the width of the traffic lanes to be monitored by the robot, the position of and the distance from the infraction line of said acquisition device, and arranging the selected optical lens or lenses of the kit at the selectable positions 1002 of the fixing plate 1000 according to the correspondence chart.

REFERENCES

Patent Literature

EP 2 690 459 A2, JENOPTIK ROBOT GMBH [DE], 29 Jan. 2014.

EP 3 012 652 A1, MORPHO [FR], 27 Apr. 2016.

WO 2022/223921 A1, IDEMIA IDENTITY & SECURITY FRANCE [FR], 27.10.2022.

The invention claimed is:

1. A road traffic monitoring robot image acquisition system installation kit including:

a plurality of optical devices with different focal lengths, each optical device including an optical lens and a photosensitive sensor, a fixing plate adapted to form a mechanical connection between a plurality of optical devices of said plurality of optical devices, in which the fixing plate includes a fixed context video camera and a plurality of selectable fixing positions for each optical device of the plurality of optical devices, said selectable fixing positions are arranged in such a manner as to form a plurality of pre-established alignments between the fixed context video camera and one or more optical devices selected from the plurality of optical devices, said pre-established alignments and said selectable positions are configured according to a correspondence chart, said correspondence chart supplies a plurality of pre-established alignments depending on the number of and the width of the traffic lanes to be monitored by the robot, the position of and the distance from an infraction line of said acquisition system, and the number of and the focal lengths of the optical lenses necessary for coverage of said traffic lanes.

2. The kit according to claim 1 such that the context video camera is a wide-angle video camera.

3. The kit according to claim 1 such that an optical plate of the context video camera coincides with an axis of symmetry of the fixing plate.

4. The kit according to claim 1 such that the plurality of optical devices includes optical lenses the focal length of which varies between 10 mm and 100 mm.

5. The kit according to claim 1 such that the fixing plate is provided with removable fixings suitable for fixing devices of the plurality of optical devices.

6. The kit according to claim 1 such that the correspondence chart covers 2 to 8 traffic lanes.

7. The kit according to claim 1 such that the fixing plate is arranged to receive at least one optical device.

8. The kit according to claim 1 such that the selectable fixing positions are arranged in such a manner that the preestablished alignments have a margin for adjustment on either side of the nominal orientation of said preestablished alignments.

9. A method of installing an image acquisition device for road traffic monitoring robots, said method comprising the following steps:

providing an installation kit according to claim 1 for an image acquisition device, assembling the plate in a space of the robot provided for this purpose, measuring the position of and the distance of the plate from the infraction line with the aid of a context video camera, selecting one or more optical devices with the same or different focal lengths from the plurality of devices of the kit according to the correspondence chart of the kit depending on the number of and the width of the traffic lanes to be monitored by the robot, the position of and the distance from the infraction line of said acquisition device, and arranging the selected optical lens or lenses at the selectable positions of the kit according to the correspondence chart of the kit.

10. The use of an installation kit according to claim 1 for an image acquisition device in a road traffic monitoring robot.

11. The kit according to claim 2 such that the context video camera is a high-resolution video camera.

12. The kit according to claim 4, such that the focal length varies between 15 mm and 50 mm.

13. The kit according to claim 7 such that the fixing plate is arranged to receive at least two optical devices.

14. The kit according to claim 7 such that the fixing plate is arranged to receive at least three optical devices.

15. The kit according to claim 8 such that the margin for adjustment is less than 5°.

16. The kit according to claim 8 such that the margin for adjustment is less than 2°.

17. The kit according to claim 8 such that the margin for adjustment is less than 1°.

* * * * *